United States Patent

Cooper

[15] 3,680,125
[45] July 25, 1972

[54] ANGULAR MODULATION DIRECTION FINDING RECEIVER

[72] Inventor: Bernard Cooper, Fair Lawn, N.J.

[73] Assignee: International Telephone and Telegraph Corporation, Nutley, N.J.

[22] Filed: June 16, 1970

[21] Appl. No.: 46,680

[52] U.S. Cl. .......................................343/115, 343/113 R
[51] Int. Cl. ...........................................G01s 3/40
[58] Field of Search........................343/113 R, 115

[56] References Cited

UNITED STATES PATENTS

| | | | |
|---|---|---|---|
| 2,471,412 | 5/1949 | Clark | 343/115 X |
| 3,340,532 | 9/1967 | Glomb et al | 343/113 R |
| 3,141,164 | 7/1964 | Holcomb et al | 343/113 R X |

Primary Examiner—Benjamin A. Borchelt
Assistant Examiner—Richard E. Berger
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An improved null-sensing direction finding receiver responsive to an angle modulated signal is disclosed. The receiver includes an omnidirectional antenna and a directional null antenna. The omnidirectional antenna output signal is down converted to encompass the modulated frequency spectrum and in turn is fed to a FMFB detector where the VCO therein closely follows the angle modulated signal. The null antenna output signal is down converted, as in the case of the omnidirectional antenna output signal and then is subjected to a second frequency conversion employing the output signal of the VCO of the FMFB detector as the local oscillator signal for the second frequency conversion. This results in an improved null-sensitivity in the order of the modulation index, since the null accuracy is a direct function of signal-to-noise ratio. A square law detector and low pass filter after the second frequency conversion provides a null detection process insensitive to random phase fluctuations of the input signals.

7 Claims, 3 Drawing Figures

PATENTED JUL 25 1972 3,680,125
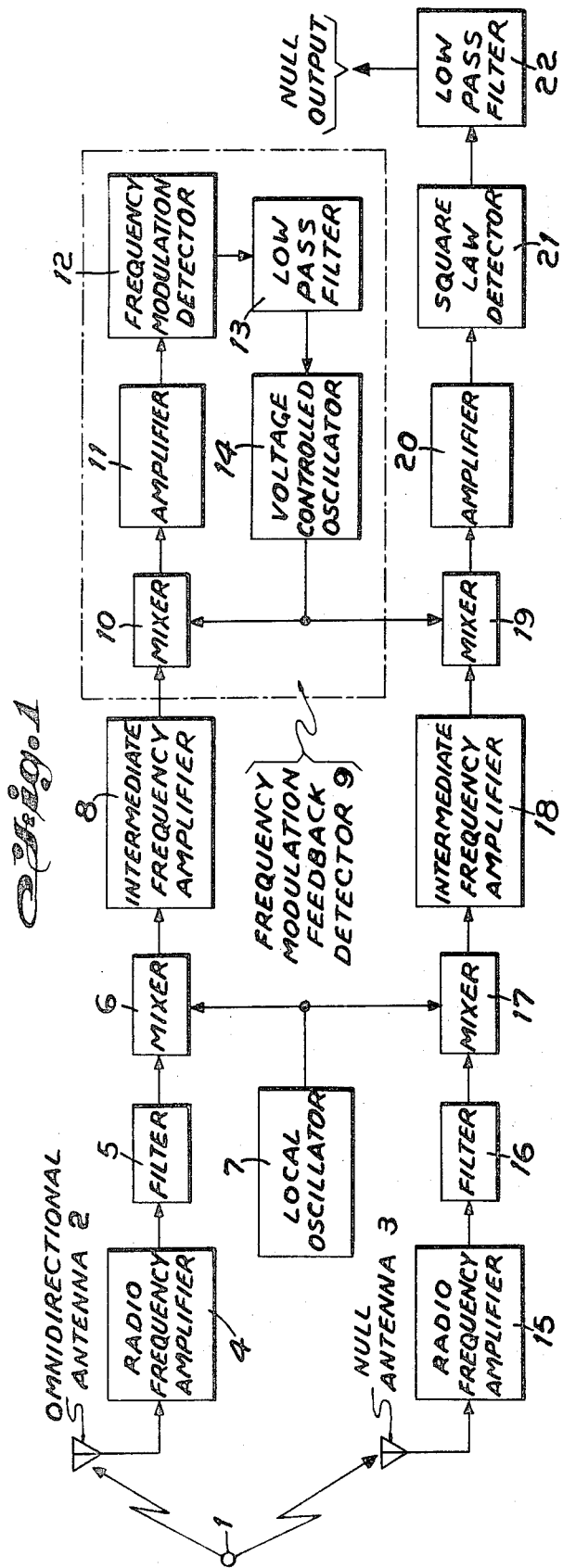
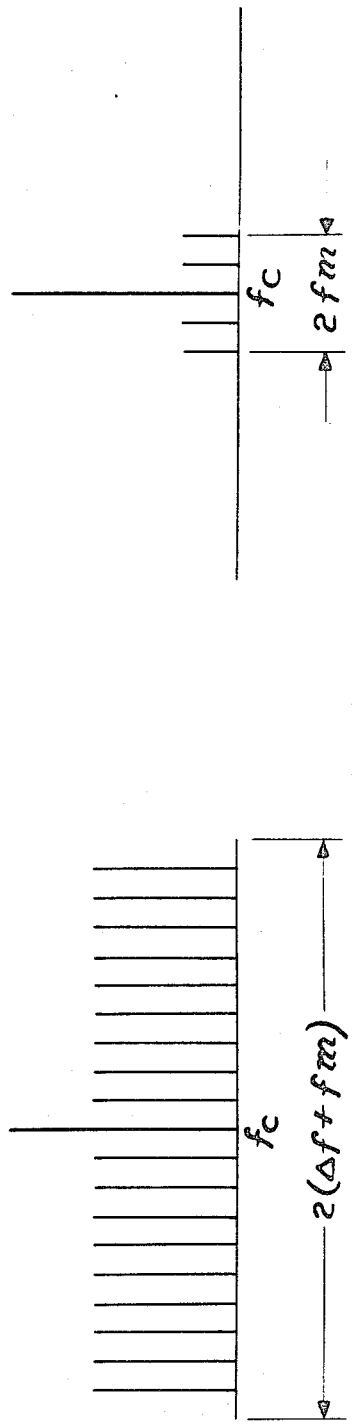
INVENTOR
BERNARD COOPER
BY Alfred C. Hill
AGENT

ANGULAR MODULATION DIRECTION FINDING RECEIVER

BACKGROUND OF THE INVENTION

This invention relates to direction finding receivers and, more particularly, to null-sensing direction finding receivers operating on an angle modulated signal.

There are applications, such as satellite tracking, position location and the like, where it is necessary to perform null-sensing direction finding on an angle modulated signal using incoherent detection techniques. In this situation, detection in the transmission bandwidth 2 ($\Delta f + f_m$) will result in degraded null-sensing performance as compared to that which could be obtained if all the transmitted power were confined to a single frequency, or a relatively narrow bandwidth of frequency.

SUMMARY OF THE INVENTION

An object of the present invention is to provide a null-sensing direction finding receiver operable on an angle modulated signal having improved null-sensitivity.

Another object of the present invention is to provide a direction finding receiver having improved null-sensitivity when operating on an angle modulated signal by utilization of frequency modulation feedback (FMFB) detector techniques.

A further object of this invention is to provide a direction finding receiver for operation on an angle modulated signal enabling incoherent null detection in a narrow band, even though the transmission bandwidth is large.

Still a further object of this invention is to provide a direction finding receiver for operation on an angle modulated signal having improved null-sensitivity and which is insensitive to random phase fluctuations of the input signals.

A feature of the present invention is the provision of a null-sensing direction finding receiver capable of direction finding on a source transmitting an angle modulated signal comprising an omnidirectional antenna in communication with the source; first means coupled to the omnidirectional antenna capable of closely following the frequency of the angle modulated signal; a directional null antenna in communication with the source; and second means coupled to the null antenna and the first means to recover a signal having an improved null-sensitivity.

Another feature of the present invention is the provision of a square law detector coupled to the output of the above mentioned second means, and a low pass filter coupled to the square law detector to provide a resultant output signal for the receiver having an increased null-sensitivity improvement with respect to the signal recovered by the second means.

BRIEF DESCRIPTION OF THE DRAWING

The above-mentioned and other features and objects of this invention will become more apparent by reference to the following description taken in conjunction with the accompanying drawings, in which:

FIG. 1 is a block diagram illustrating the direction finding receiver in accordance with the principles of the present invention;

FIG. 2 is a diagram illustrating the frequency spectrum of an angle modulated signal; and FIG. 3 is a diagram illustrating the reduction in predetection bandwidth by employing the direction finding receiver of FIG. 1.

DESCRIPTION OF THE PREFERRED EMBODIMENT

Referring to FIG. 1, there is disclosed therein a direction finding (DF) receiver capable of providing improved null-sensitivity and enabling the determination of the direction of a source 1 of angle modulated signal. The signal from source 1 could be the output signal of an angle modulated transmitter in a satellite, an aircraft, other mobile vehicles or stationary transmitter station upon which it is desired to direction find. The resultant null output signal may be utilized to activate an appropriate DF meter, or associated circuitry for tracking, position location and the like.

The DF receiver includes omnidirectional antenna 2 in communication with source 1 and a directional null antenna 3 in communication with source 1. The angle modulated signal received by antenna 2 is applied to a radio frequency amplifier 4 and, hence, to a filter 5. The output of filter 5 is coupled to a mixer 6 receiving its heterodyning signal from local oscillator 7. Radio frequency amplifier 4, filter 5 and mixer 6 together with local oscillator 7 operate to convert the angle modulated signal received by antenna 2 to an intermediate frequency signal having a given center frequency and a bandwidth sufficient to encompass the frequency spectrum of the angle modulated signal.

The thusly produced intermediate frequency signal is applied to intermediate frequency amplifier 8 and then to FMFB detector 9. As is normal, detector 9 includes a mixer 10, a loop amplifier 11, a frequency modulation (FM) detector 12 and a low pass filter 13 whose output is coupled to a voltage controlled oscillator (VCO) 14 which in turn, is coupled as the local oscillator to mixer 10. The operation of detector 9 is to cause the frequency of the output signal of VCO 14 to closely follow the frequency of the angle modulated signal with a suitable frequency offset.

The signal received on directional null antenna 3 is likewise coupled to a radio frequency amplifier 15 and, hence, to a filter 16 prior to being coupled to mixer 17 which employs as its local oscillator oscillator 7. The output of mixer 17 is likewise an intermediate frequency signal having the same center frequency as the signal at the output of mixer 6 and with the same bandwidth. The output of mixer 17 is coupled to intermediate frequency amplifier 18 and, hence, to a mixer 19 for a second frequency conversion wherein the local oscillator for mixer 19 is the VCO 14 of detector 9. This results in an output of mixer 19 having a predetection bandwidth reduced to approximately twice the baseband (modulating signal bandwidth). This represents an improvement on the order of the modulation index in system performance (null accuracy), since null accuracy is a direct function of the signal-to-noise ratio. This is demonstrated in the diagram of FIGS. 2 and 3. FIG. 2 illustrates the frequency spectrum of a normal angular modulated signal as received from source 1 wherein the sidebands surrounding the center frequency $f_c$ are like white noise and has a relatively wide bandwidth. It is due to this wide bandwidth and reduced signal-to-noise ratio that the prior art direction finding system receivers operating on angle modulating signals have had degraded null sensitivity. However, in accordance with the principles of the receiver of this invention the output signal of mixer 19 has a frequency spectrum similar to that illustrated in FIG. 3, namely, a relatively narrow bandwidth and an improved signal-to-noise ratio. This narrow bandwidth is achieved by employing VCO 14 of detector 9 as the local oscillator for mixer 19 wherein the frequency of the output signal of VCO 14 closely follows the frequency of the angle modulated frequency received by antenna 2 and, hence, the angle modulated signal received by antenna 3.

After the second frequency conversion as performed in mixer 19 a signal is provided having an improved null-sensitivity. This signal can be applied to an amplifier 20 and, hence, to a square law detector 21 and low pass filter 22 which will provide a resultant output signal for the receiver having the improved null-sensitivity and which is insensitive to random phase fluctuations of the input signals.

While I have described above the principles of my invention in connection with specific apparatus, it is to be clearly understood that this description is made only by way of example and not as a limitation to the scope of my invention as set forth in the objects thereof and in the accompanying claims.

I claim:

1. A null-sensing direction finding receiver capable of direction finding on a source transmitting an angle modulated signal comprising:

an omnidirectional antenna in communication with said source;

first means coupled to said omnidirectional antenna capable of closely following the frequency of said angle modulated signal;

a directional null antenna in communication with said source;

second means coupled to said null antenna and said first means to recover a signal having an improved null-sensitivity;

a square law detector coupled to said second means to operate on said signal having an improved null-sensitivity; and a low pass filter coupled to said detector to provide a resultant improved null-sensitivity output signal for said receiver which is insensitive to random phase fluctuations of said signal from said source.

2. A receiver according to claim 1, wherein
said first means includes
   third means coupled to said omnidirectional antenna to convert said angle modulated signal received thereby to an intermediate frequency signal having a given center frequency and a bandwidth sufficient to encompass the modulated frequency spectrum of said angle modulated signal, and
   a frequency modulation feedback detector coupled to said third means, said detector including a voltage controlled oscillator whose output signal closely follows the frequency of said intermediate frequency signal.

3. A receiver according to claim 1, wherein
said second means includes
   third means coupled to said null antenna to convert said angle modulated signal received thereby to an intermediate frequency signal having a given center frequency and a bandwidth sufficient to to encompass the modulated frequency spectrum of said angle modulated signal, and
   a mixer coupled to said third means and said first means to recover said signal having an improved null-sensitivity.

4. A receiver according to claim 1, wherein
said first means includes
   a frequency modulation feedback detector coupled to said omnidirectional antenna, said feedback detector including a voltage controlled oscillator whose output signal closely follows the frequency of said angle modulated signal.

5. A receiver according to claim 4, wherein
said second means includes
   a mixer coupled to said null antenna and said voltage controlled oscillator to provide said signal having an improved null-sensitivity as an input signal for said square law detector.

6. A receiver according to claim 1, wherein
said first means includes
   third means coupled to said omnidirectional antenna to convert said angle modulated signal received thereby to a first intermediate frequency signal having a given center frequency and a bandwidth sufficient to encompass the modulated frequency spectrum of said angle modulated signal, and
   a frequency modulation feedback detector coupled to said third means, said feedback detector including a voltage controlled oscillator whose output signal closely follows the frequency of said first intermediate frequency signal; and
said second means includes
   fourth means coupled to said null antenna to convert said angle modulated signal received thereby to a second intermediate frequency signal having said given frequency and said bandwidth, and
   a mixer coupled to said fourth means and said voltage controlled oscillator to provide said signal having an improved null-sensitivity as an input signal for said square law detector.

7. A receiver according to claim 6, wherein
said third and fourth means include
   a common local oscillator.

* * * * *